United States Patent

Parsons

[15] 3,674,293
[45] July 4, 1972

[54] EXPANSIBLE CONNECTOR FOR JOINING TUBES

[72] Inventor: Ronald W. Parsons, Newmarket, Ontario, Canada

[73] Assignee: Allcock, Laight & Westwood Limited, Bramalea, Ontario, Canada

[22] Filed: Oct. 28, 1970

[21] Appl. No.: 84,791

[52] U.S. Cl.................................287/56, 287/124, 182/228
[51] Int. Cl.............................................................F16b 7/00
[58] Field of Search..............287/56, 54 A, 54 C, 54 B, 124, 287/2; 285/189; 182/228

[56] References Cited

UNITED STATES PATENTS

| 1,404,522 | 11/1922 | Harris | 287/20 R X |
| 2,018,250 | 10/1935 | Cohan | 287/54 C |
| 1,958,981 | 5/1934 | Wilczek | 287/124 X |
| 2,198,964 | 4/1940 | Goodyear | 287/124 X |
| 1,959,008 | 5/1934 | Spaloss | 306/29 |
| 3,278,209 | 10/1966 | Winikoff | 287/54 B |

FOREIGN PATENTS OR APPLICATIONS

| 1,213,997 | 11/1959 | France | 285/189 |

Primary Examiner—Andrew V. Kundral
Attorney—Sim & McBurney

[57] ABSTRACT

A connector for joining a first elongated tube and a second tube having a hollow end portion at an angle to the first tube includes an integral body having a saddle to engage the outer surface of the first tube and a split pin portion resiliently deflectable relative to the saddle. The split pin has a passageway extending to the longitudinal length thereof in communication with an opening in the saddle portion. The split pin is forced apart to engage and grip the inside surface of the hollow end portion of the second tube upon receiving an elongated pin through the opening in the saddle into the passageway.

9 Claims, 3 Drawing Figures

PATENTED JUL 4 1972 3,674,293
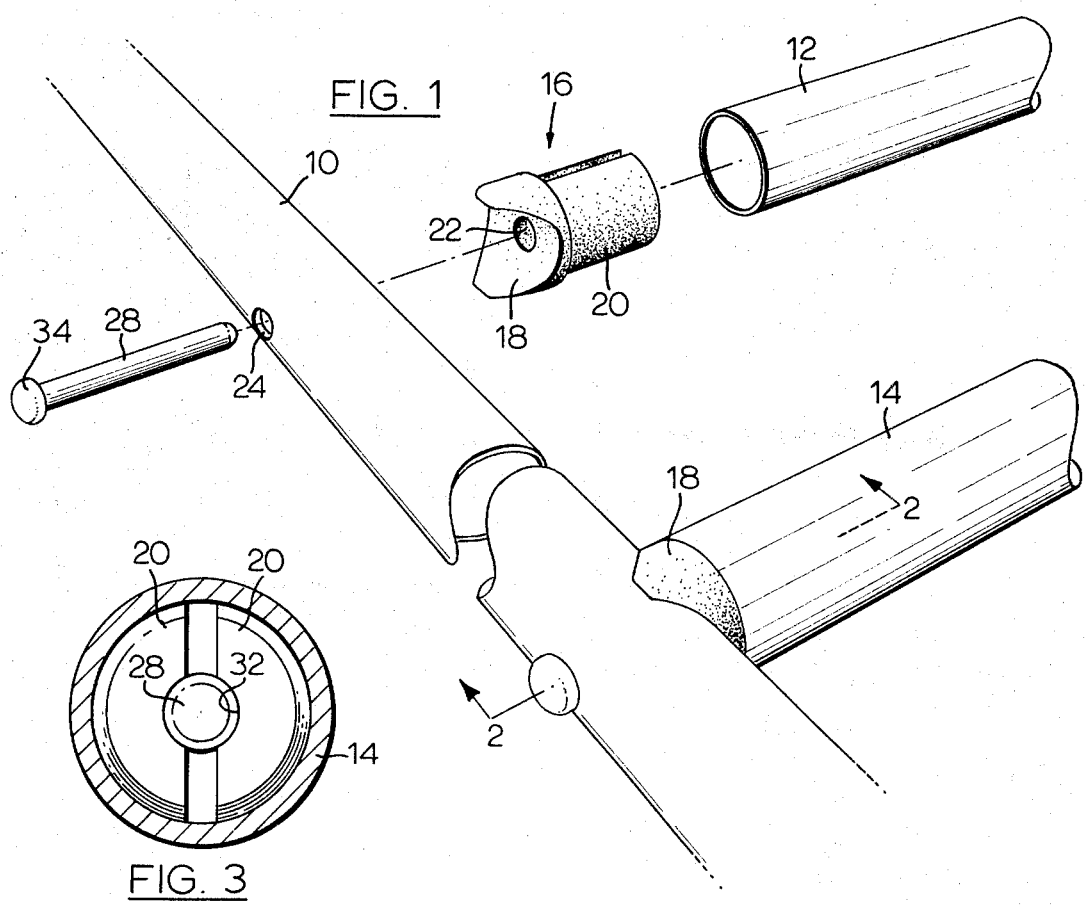
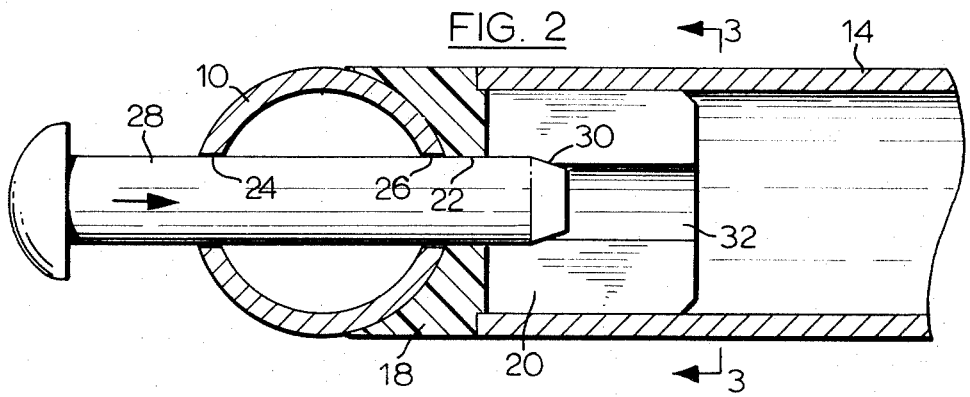
INVENTOR.
RONALD W. PARSONS
BY [signature]
Agent

EXPANSIBLE CONNECTOR FOR JOINING TUBES

The present invention relates to a connector, more especially to a connector for joining a first tube to a second tube at an angle to the first tube.

Various proposals have been made to connect tubes at angles to each other, generally with one end of one of the tubes terminating at right-angles to the other tube. Many of these proposals have involved the use of complicated devices.

The connector of the present invention is simple to use and consists of an integrally formed body which is strong and forms the required joint in very effective and efficient manner.

The integral body of the connector of the present invention includes a saddle portion which engages the outer surface of one of the tubes and a split pin portion received in the end of the other of the tubes. The split pin portion is resiliently deflectable relative to the saddle portion. An opening is formed in the saddle portion in communication with a passageway extending the longitudinal length of the split pin portion. The split pin portion is forced apart upon receiving the elongated pin in the passageway so that peripheral portions of the split pin engage and grip the inside surface of the other of the tubes.

The invention is illustrated by the accompanying drawing, in which:

FIG. 1 is a perspective view of two joints each including a connector according to one embodiment of the invention the components being assembled in one case and exploded in the other;

FIG. 2 is a sectional view taken along line 2—2 of FIG. 1; and

FIG. 3 is a sectional view taken along line 3—3 of FIG. 2.

An elongated tube 10 is connected to elongated tubes 12 and 14 at right angles thereto. The manner in which the joint between tubes 10 and 12 is achieved is shown in exploded form, while the manner in which the joint between tubes 10 and 14 is achieved is shown in assembled form.

The joint is illustrated formed between tubes. The connector 16 of the present invention may be employed to join elongated members of different shape and form from those illustrated. For example, the tube 10, while illustrated as hollow, may be a solid rod. Similarly, the tubes 12 and 14 may be solid rods each having a hollowed out end portion. Alternatively, the solid rod may be provided with a hollow tubular part attached to one end to receive the connector.

Further, the elongated tubes are illustrated as cylinders having a circular cross-section. Tubes having other shapes in cross-section may be joined using the connector of the invention, for example, tubes having square, oval or rectangular cross-sections, or tubes having different cross-sections, for example, one tube having circular cross-section and another tube having square cross-section.

Additionally, the elongated members to be joined are illustrated as having substantially the same diameter. The connector of the invention may be used to join tubes of differing diameters.

The connector of the present invention therefore is very versatile in its ability to join tubes of differing types.

The joint is achieved by the use of a connector 16 which includes a saddle portion 18 and a split pin portion 20 integral with the saddle portion. The saddle portion 18 engages the outer surface of the tube 10 and has an opening 22 formed therein.

Preferably the radius of curvature of the saddle portion is the same as that of the portion of the outer surface of the tube 10 to be engaged, so that the whole surface area of the saddle portion 22 engages the outer surface of the tube 10. Where the cross-section of the tube 10 is other than circular, the shape of the saddle 22 may be varied to conform substantially to the shape of the outer surface of the tube 10.

Preferably, the saddle portion has a diameter substantially that of the tubes 12 and 14 in order to present a smooth external appearance.

The opening 22 in the saddle portion coincides with diametrically opposed openings 24 and 26 in the tube 10. An elongated pin 28 passes through the openings 24 and 26 and through the opening 22 in the saddle portion 18. To aid the pin 28 in locating in the opening 22, the lead end includes a taper 30. Such a taper is not essential, however, to the operation of the connector.

The pin 28 is illustrated passing through two openings. If desired, the opening 24 may be made so large that the head 34 of the pin passes therethrough and engages the inner wall of the tube 10 adjacent the opening 26. It is preferred, however, to have the pin 28 engage the tube 10 in the manner illustrated, since this provides maximum stability.

Additionally, in the event the tube 10 is a solid bar, the opening formed diametrically thereacross to allow the pin to pass therethrough may be countersunk to allow the head 34 of the pin to lie below the outer surface of the rod.

The openings 24 and 26 preferably are of slightly greater diameter than that of the pin 28 to allow easy passage of the pin therethrough.

The pin 28 is shown as a smooth surfaced cylinder of circular cross-section. The pin may take the form of a self-tapping screw, if desired. Additionally, the pin need not be of circular cross-section, but may be square, oval or rectangular, if desired.

The split pin portion 20 of the connector 16 enters the end of the tubes 12 and 14 and has a passageway 32 formed the longitudinal length thereof. The passageway 32 is in communication with the opening 22. The split pin portion 20 is resiliently deflectable with respect to the saddle portion 18. The pin 28, after passing through the opening 22, passes into passageway 32. The passageway has a diameter slightly less than that of the pin 28 and hence the pin deflects the parts of the split pin 20 so that they grip the internal surface of the tube 12 or 14.

The split pin portion 20 is illustrated as including two parts. This is the preferred mode of construction, but the split pin portion may be constructed with more than two parts, if desired.

Additionally, the whole of the outer surface of the split pin portion engages and grips the inside surface of the tube 12 or 14 upon insertion of the pin 28 in the passageway 32. It is not necessary that this be the case, and it is within the scope of the invention that only part of the outer surface of the split pin portion engage the inside surface of the tube 12 or 14.

Further, while, in the embodiment illustrated, the split pin portion is shaped to conform to the shape of the internal surface of the end of the tube into which it is inserted, it is not essential that such be the case. It is possible to provide a round split pin portion to fit into a square-ended tube, or a square-shaped split pin portion to fit into a rounded-ended tube. So long as at least a portion of the external surface of the split pin portion engages and grips part of the internal surface of the tube, a satisfactory joint may be achieved.

The joint therefore may be achieved in simple manner by inserting the split pin portion of the connector 16 into the opening in the end of tube 12, aligning the openings 22, 24 and 26 and inserting the pin 28 through openings 24 and 26 so that the taper 30 engages the opening 22. While maintaining this relative location of the parts, the pin is driven through the opening 22 and into the passageway 32, so that the parts of the split pin portion 20 are splayed and thereby grip the internal wall of tube 12. The pin 28 is driven until its head 34 engages the external surface of the tube 10.

By reason of the gripping action of the split pin portion 20 on the internal surface of the tube 12, the tubes 10 and 12 are fixed relative to each other and are not readily separated by pulling.

The joint is illustrated as being formed between the end of tubes 12 and 14 at right angles to tube 10. It is possible to modify the shape of the connector 16 to provide the tubes 12 and 14 at other angles to tube 10.

In order to disassemble the joint, the pin 28 is withdrawn. As the pin is withdrawn from the passageway 32, the resiliency of the split pin portion 20 returns it to its original position and the tube 12 may be separated from the connector.

The connector of the invention may be used in many applications where it is desired to join two tubes at an angle to each other. One particular application is in the construction of ski racks where cross-pieces are connected between spaced parallel tubes.

The connector of the invention may be formed in any convenient manner, from any convenient material of construction, for example, nylon or polypropylene.

Modifications are possible within the scope of the invention.

I claim:

1. A joint consisting of a first elongated member, a second elongated member having a hollow end portion, a connector for connecting said second elongated member at an angle to said first elongated member, said connector comprising an integral body having a saddle portion engaging the outer surface of said first elongated member, and a split pin portion, said split pin portion being resiliently deflected relative to said saddle portion and projecting into and in gripping engagement with the hollow end portion of said second elongated member, and an elongated pin projecting through said first elongated member, passing through an opening in said saddle portion in engagement with the walls of the opening, and projecting into a passageway extending the longitudinal length of said split pin portion and resiliently deflecting said split pin portion, said elongated pin having a cylindrical shank of diameter slightly greater than that of the passageway.

2. The joint of claim 1, wherein said first and second elongated members are hollow cylindrical tubes.

3. The joint of claim 1, wherein said split pin portion has the same external shape as the internal surface of said hollow end portion of said second elongated member.

4. The joint of claim 1, wherein said elongated pin is a cylindrical smooth surfaced pin having a diameter slightly greater than that of said passageway.

5. The joint of claim 1, wherein said elongated pin has a tapered nose.

6. The joint of claim 2, wherein said saddle portion has a diameter substantially that of the second elongated member.

7. A connector assembly for joining a first elongated member and a second member having a hollow end portion at an angle to said first elongated member, comprising an elongated pin, an integral body including a saddle portion adapted to engage the outer surface of said first elongated member, said saddle portion having an opening formed therein to receive therethrough in touching engagement said elongated pin, and a split pin portion, said split pin portion being resiliently deflectable relative to said saddle portion, said split pin portion having a passageway extending the longitudinal length thereof in communication with the opening in said saddle portion, said elongated pin having a cylindrical shank of diameter slightly greater than that of the passageway, said split pin portion being adapted to be forced apart so that peripheral portions thereof engage and grip the inside surface of said hollow end portion of said second elongated member upon receiving said elongated pin in the passageway.

8. The connector of claim 7 wherein said split pin portion consists of two parts.

9. The connector of claim 7 wherein the whole of the peripheral portion of said split pin portion engages and grips the inside surface of said second hollow elongated member.

* * * * *